United States Patent [19]

Abbey

[11] 4,343,915
[45] Aug. 10, 1982

[54] POLYSPIROLACTONE POLYMERS

[75] Inventor: Kirk J. Abbey, Cleveland, Ohio

[73] Assignee: SCM Corporation, New York, N.Y.

[21] Appl. No.: 292,297

[22] Filed: Aug. 12, 1981

[51] Int. Cl.³ .................... C08G 59/42; C08G 63/00; C08G 63/76
[52] U.S. Cl. .................... 523/414; 523/420; 525/418; 525/533; 528/95; 528/106; 528/121; 528/354; 528/365
[58] Field of Search .................... 525/418, 533; 260/29.2 EP; 528/95, 106, 121, 354, 365

[56] References Cited

U.S. PATENT DOCUMENTS 3,984,439 10/1976 Vanlantem et al. ............ 528/361 X
4,064,086 12/1977 Cowsar et al. ................ 528/354 X
4,265,247 5/1981 Lenz et al. .................... 528/361 X

*Primary Examiner*—Earl A. Nielsen
*Attorney, Agent, or Firm*—Thomas M. Schmitz

[57] ABSTRACT

A polyspirolactone polymer particularly suitable for protective surface coatings comprises a spirolactone structure in the polymer structure adapted to be cross-linked with a primary or secondary amine compound to produce a thermoset protective coating.

18 Claims, No Drawings

POLYSPIROLACTONE POLYMERS

BACKGROUND OF THE INVENTION

Spirolactones are bicyclic compounds having one carbon atom common to both cyclic ring structures wherein each cyclic structure is a lactone. A lactone is a heterocyclic ring structure containing an oxygen in the cyclic ring and a ketone group on a cyclic carbon adjacent to the hetero oxygen atom. Spirolactones have been suggested for use as a thermoplastic hydrogel by reacting a spirolactone with a difunctional active hydrogen compound such as proposed in U.S. Pat. No. 4,064,086.

It now has been found that a thermosetting polyspirolactone polymer structure preferably containing two or more spirolactone structures can be cross-linked with a diamine or triamine or similar polyamine to produce an excellent cured surface coating composition. The polyspirolactone polymer can be a moderately low molecular weight polymer which is particularly suitable for high solids coatings. The coating composition can be produced by reacting an oxirane resin such as a diepoxide resin with a lower alkyl malonate such as diethyl malonate in the presence of a catalyst to produce a polyspirolactone polymer. The polymer structure is then mixed with a polyamine which is adapted to heat-cure and cross-link the polyspirolactone polymer by opening two or more of the lactone ring structures to form amide linkages.

SUMMARY OF THE INVENTION

Briefly, in accordance with this invention, the composition comprises a ratio between 1:10 and 10:1 on an equivalence basis of polyspirolactone to polyamine. On a weight basis the composition comprises between 99% and 1% polyspirolactone polymer containing at least one spirolactone ring structure, and preferably two or more spirolactone ring structures in the polymer structure, and between 1% and 99% of a polyfunctional amine, whereby the polyamine is adapted to coreact with and open the spirolactone structure to cross-link adjacent polymer chains containing lactone rings of spirolactone structures. The process comprises the steps of reacting an oxirane or epoxy resin containing two oxirane groups with a lower alkyl malonate to produce a polyspirolactone polymer containing a spirolactone structure. The polyspirolactone polymer is then mixed with a polyamine which heat cures and cross-links the polyspirolactone polymer through the lactone structure into a thermoset surface coatings or molded articles.

DETAILED DESCRIPTION OF THE INVENTION

The coating composition comprises a resin mixture of oxirane spirolactone polymer and polyamine, whereby the resin mixture can be heat cured to form a cured surface coating based on a cross-linked polymer structure.

The oxirane spirolactone polymer can be produced by reacting diepoxy resin with a lower alkyl malonate to form a polyspirolactone polymer which may contain epoxy terminal units and at least one spirolactone unit. The epoxy adduct can be an aliphatic or aromatic or a cycloaliphatic diepoxide prepolymer having a molecular weight greater than 150. Epoxies are ordinarily produced by condensation of epichlorohydrin or dichlorohydrin with bisphenols or polyhydric phenols, polyalcohols, polyfunctional halohydrins and certain polyepoxides. Monoepoxides such as phenyl glycidyl ether and poly epoxides can be used with diepoxides within well known limits to prevent gelation, although all diepoxides are preferred. Useful epoxy polymers are produced by reacting epichlorohydrin or dichlorohydrin with bisphenols such as bisphenol-A to provide linear epoxy polymers having pendant epoxide groups, and preferred epoxies are epichlorohydrin reacted with bisphenol-A. Although epichlorohydrin and dichlorohydrin are preferred reactants with phenols to provide pendent epoxy groups, other means for introducing epoxide groups into the polymer chain are suitable such as by reacting various glycidol ethers of glycerol with other polymer chains, epoxidizing olefinic unsaturation, and reacting carbenes with ketones. Diepoxides are preferred although higher epoxy resins can be used.

The epoxy resin is then reacted with a lower dialkyl malonate to produce an oxirane spirolactone polymer which can contain residual epoxy functionality. Lower dialkyl malonates are dialkyl esters of malonic acid wherein the alkyl groups can be the same or mixed alkyls having between 1 and 4 carbon atoms. Clearly higher alkyl or alkylaryl, or aryl esters could be used. Those suitable dialkyl malonates include for example dimethyl malonate, diethyl malonate, dipropyl malonates and dibutyl malonates, or similar mixed esters of malonic acid. The dialkyl malonates are reacted with epoxy resin on a molar basis of between 0.1 and 1.0 moles of malonate per equivalent of epoxide to produce a spirolactone according to a process hereinlater described. Lower levels of between about 0.1 and 0.4 moles of malonate diesters produces a polymer containing epoxy end groups. High levels between about 0.6 and 1 moles of malonate diester will produce a spirolactone polymer containing monolactone end groups, whereas between 0.4 and 0.6 moles malonate per 1 equivalent of oxirane (diepoxy compound) will produce a spirolactone polymer containing a mixture of epoxy groups and monolactone groups. A desirable high molecular weight polyspirolactone will be produced by reacting about 0.5 moles malonate per 1 equivalent of oxirane resin. The spirolactone polymer has a molecular weight between about 350 and about 30,000.

The oxirane spirolactone polymer is then mixed with a polyamine to provide a thermosetting resin mixture. Suitable polyamines include diamines or triamines or higher polyamines and can include for instance aliphatic diamines such as cyclohexanediamines, tetramethylene, hexamethylene, octamethylene and similar alkyl diamines; aromatic diamines such as m- and p-phenylene, piperazines, toluene, as well as biphenyldiamines and and similar aromatic diamines. Similar triamines are useful such as diethylene triamine, triaminobenzene, and similar polyamines.

In accordance with the process of this invention, epoxy resin is first reacted in the presence of a catalyst with a dialkyl malonate to produce an oxirane spirolactone polymer. The epoxy resin and malonate are co-reacted together under heat between about 130° C. and 180° C. and in the presence of about 0.1 and 1 mole percent catalyst. The catalyst can be various metal halides or various amine. Lithium iodide is particularly preferred. The lower alcohol reaction product is drawn off as distillate until the spirolactone formation is substantially completed. The finished oxirane spirolactone polymer can be dispersed into a suitable solvent such as butyl Cellosolve or hexa Cellosolve or similar Cellosolve acetates as well as tetrahydrofuran or methylene chloride. The amount of solvent can vary to provide an organic solution polymer containing between about 20% and 90% by weight polymer solids. The oxiranespirolactone polymer is then mixed with a polyamine on a weight basis of between about 0.01 and 100 pounds of amine per pound of spirolactone polymer. The amine is added to the epoxy spirolactone polymer solution just prior to use. The resulting mixture provides an excellent binder for heat cured clear or pigmented coatings as well as molding compositions. Heat cure can be at 150° C. to 200° C. for about 10 to 20 minutes. The coating compositions can be dispersed in water to provide dilute aqueous electrocoating compositions. Preferred catalysts for polyspirolactone compositions include metal halides and most preferably lithium iodide.

The merits of this invention are further illustrated by the following examples:

EXAMPLE 1

Epoxy spirolactones were produced as follows:

a. About 2.62 oxirane equivalents of epoxy resin Epon 828 was reacted with 2.62 equivalents of diethyl malonate in the presence of 0.8 mole percent of lithium iodide at about 145° C. for about 2.25 hours. The resulting epoxy spirolactone had a weight average molecular weight of 3720, a weight/number average molecular weight ratio of 3.07, an acid number 12, a hydroxy content of 1.8%, a glass transition temperature (Tg) of 50° C., and 15.3% of the original oxirane remains.

b. About 2.06 oxirane equivalents of epoxy resin Eponex DRH 151 was reacted with 2.06 equivalents of diethyl malonate in the presence of 0.8 mole percent of lithium iodide at about 155° C. for about 3 hours. The result is an epoxy spirolactone polymer having a molecular weight of 5710, a weight/number average ratio of 3.58, an acid No. of 1.1, a % hydroxyl of 5%, a Tg of 39° C., and 6.1% of the original oxirane remains.

EXAMPLE 2

An epoxy spirolactone which was useful in aqueous electrocoating compositions was produced by reacting epoxy resin (Shell Chemical Eponex 151 cycloaliphatic epoxy resin) with diethyl malonate as follows:

TABLE I

| (645-53) | | |
|---|---|---|
| A. | epoxy resin | 1776 grams |
| | diethylmalonate | 584 grams |
| | lithium iodide | 7.9 grams |
| B. | butyl Cellosolve | 525 grams |

Raw materials A were loaded to a reactor equipped with an agitator and $N_2$ sparge. The mixture was heated to about 130° C. over 15 minutes, at which time the $N_2$ sparge was turned off, and eventually to 155° C. Distillation of ethyl alcohol began at 145° C. after about 25 minutes. Total time for distillation was 160 minutes and distillate collected was about 268 grams. The mixture was then cooled to 140° C. whereupon B was added and the mixture was cooled to room temperature.

The epoxy spirolactone polymer dispersed in solvent was then mixed with amine as follows:

| C. | epoxy spirolactone | |
|---|---|---|
| | polymer solution | 993.5 grams |
| D. | N, N-dimethylaminopropylamine | 72 grams |
| E. | butyl Cellosolve | 123 grams |

The epoxy spirolactone polymer solution C, was heated to 140°-145° C. in a reaction flask equipped with agitation. Material D was then added dropwise to the flask over 2½ hours. The reaction mixture was then held for 10 minutes, and thereafter E was then added. The resulting mixture was then agitated moderately for about 25 minutes, cooled and stored. The resulting mixture had a non-volatile content of 77.2 by weight, a base No. of 30.9 indicating 100% consumption of the primary amine.

The resulting amine modified epoxy spirolactone polymer was then dispersed into water to produce a dilute aqueous electrocoating solution as follows:

| amine modified polymer | |
|---|---|
| solution | 110 grams |
| 85% lactic acid | 6.2 grams |
| water, de-ionized | 566 grams |

The amine modified polymer solution was warmed moderately. The lactic acid was added and the mixture was stirred for about 60 minutes. The water was then added over 60 minutes with good agitation. The resulting mixture was suitable for an electrocoating composition and was electrocoated cathodically onto steel test coupons, baked for 15 minutes at 177° C. An excellent paint film was produced having a pencil hardness of HB.

EXAMPLE 3

The epoxy spirolactone polymer of Example 1b was compounded as follows:

| epoxy spirolactone polymer | 19.95 grams |
|---|---|
| tetrahydrofuran solvent | 10.0 grams |
| hydrogenated bis (para aminophenyl) methane | 2.50 grams |

The polymer was dispersed in the solvent by mixing, whereupon the amine was blended in. The mixture had extended room temperature stability and films cured in 30 minutes at 150° C.

EXAMPLE 4

Thermosetting epoxy spirolactone polymers were made as follows:

a. Cathodic Electrocoat Resin from Poly (Spirolactone)

| Group | Ingredient | Weight (g) |
|---|---|---|
| A | Eponex DHR 151 | 1092 |
| | DEM | 320 |
| | LiI | 4 |
| B | Hexa Cellosolve | 400 |
| C | Diethanolamine | 206 |

Procedure (1) Load A and sparge with $N_2$ for 5 minutes.
(2) Switch to $N_2$ blanket, heat to 150° C. (first EtOH collected after 35 minutes) (after 3 hours and 20 minutes 150 ml EtOH collected. Oxirane found=2.32)

(3) After 3 hours and 45 minutes, add all of B (caused to cool to 100° C.).
(4) After 10 minutes further add C over 21 minutes (dropped to 78° C.).
(5) Continue to stir for 2 hours.

The resin had an N.V. of 74.5% and a base number of 52.2. A water "solution" was prepared as shown below.

b. Electrocoat Dispersion Made From Resin in (a).

| Group | Ingredient | Weight (g) |
|---|---|---|
| A | Resin (a) | 129.0 |
| B | Lactic Acid (88% solution) | 10.3 |
| C | De-ionized water | 663 |

Procedure:

(1) To slightly warm A add B; stir well (25 minutes).
(2) To the mixture in (1) add C with stirring (dissolved readily).
(3) Let stir at room temperature for 24 hours to ensure equilibration.

Samples of the solution from (b) were electrocoated onto steel panels for 90 seconds with "dead entry." The panels were then baked at 300° F. for 20 minutes. As no curing agent was added to the system, the coating did not cure and wet adhesion was poor.

I claim:

1. A composition comprising on a weight basis between about 1% and 99% polyspirolactone polymer containing at least one spirolactone ring structure in the polymer structure and having a molecular weight between about 350 and 30,000, and between about 1% and 99% polyfunctional amine, whereby said amine is adapted to coreact upon heating and cross-link with said polyspirolactone polymer to form a thermoset cross-linked polymer.

2. The composition in claim 1 wherein the composition is a thermosetting binder in a surface coating composition.

3. The coating composition in claim 2 wherein the polyspirolactone polymer comprises a diepoxide polymer having a molecular weight greater than 150 reacted with a lower alkyl malonate wherein said polyspirolactone polymer contain between 0.1 and 1.0 moles of said malonate per equivalent of epoxide.

4. The coating composition in claim 3 wherein the polyspirolactone polymer contains between 0.1 and 0.4 moles of said malonate, and said polyspirolactone polymer contains end groups comprising predominately epoxy end groups.

5. The coating composition in claim 3 wherein the polyspirolactone polymer contains between 0.4 and 0.6 moles of said malonate, and said polyspirolactone polymer contains end groups comprising a mixture of epoxy and monolactone groups.

6. The coating composition in claim 3 wherein the polyspirolactone polymer contains between 0.6 and 1 moles of said malonate, and said polyspirolactone polymer contains end groups comprising predominately monolactone end groups.

7. The coating composition in claim 3 wherein the lower alkyl malonate is a dialkyl ester of malonic acid wherein each alkyl group has 1 to 4 carbon atoms.

8. The coating composition in claim 2 wherein the binder is dispersed into water.

9. A process for producing a thermosetting composition comprising a polyspirolactone adapted to be co-reactive with a polyfunctional amine, the process steps comprising:
   forming a polyspirolactone polymer by reacting between 0.1 and 1 mole of a lower alkyl malonate with 1 equivalent of epoxy resin having a molecular weight above about 150 to form polyspirolactone polymer having a molecular weight between about 350 and 30,000;
   mixing with said polyspirolactone polymer between about 0.01 and 100 pounds of a polyfunctional amine per pound of said polyspirolactone polymer;
   heat curing said mixture to coreact said polyspirolactone with said amine.

10. The process of claim 9 wherein the epoxy resin reacted said malonate in the presence of a catalyst at temperatures between about 130° C. and 180° C.

11. The process in claim 10 wherein the catalyst is lithium iodide.

12. The process of claim 9 wherein the polyspirolactone and said amine provide a thermosetting binder for a surface coating composition.

13. The process of claim 9 wherein the binder is dispersed in water.

14. A composition comprising a spirolactone polymer containing two or more spirolactone ring structures in the polymer structure, and said polymer has a molecular weight between about 350 and 30,000.

15. The composition in clam 14 wherein the composition contains a polyfunctional amine for cross-linking said polyspirolactone polymer.

16. The composition in clam 15 dispersed into water to form an electrocoating composition and said amine is a difunctional amine wherein one amine group is a tertiary amine group and the other amine group is either a primary or secondary amine group.

17. The composition in clam 16 wherein the electrocoating composition contains a halide metal catalyst.

18. The composition in claim 15 wherein the electrocoating composition contains lithium iodide as a catalyst.

* * * * *